3,247,883
TIRE CHANGING TOOL
Elmer J. Strang and Ray A. Scott, Fort Dodge, Iowa, assignors to The Coats Company, Inc., a corporation of Iowa
Filed Feb. 13, 1964, Ser. No. 344,634
3 Claims. (Cl. 157—1.22)

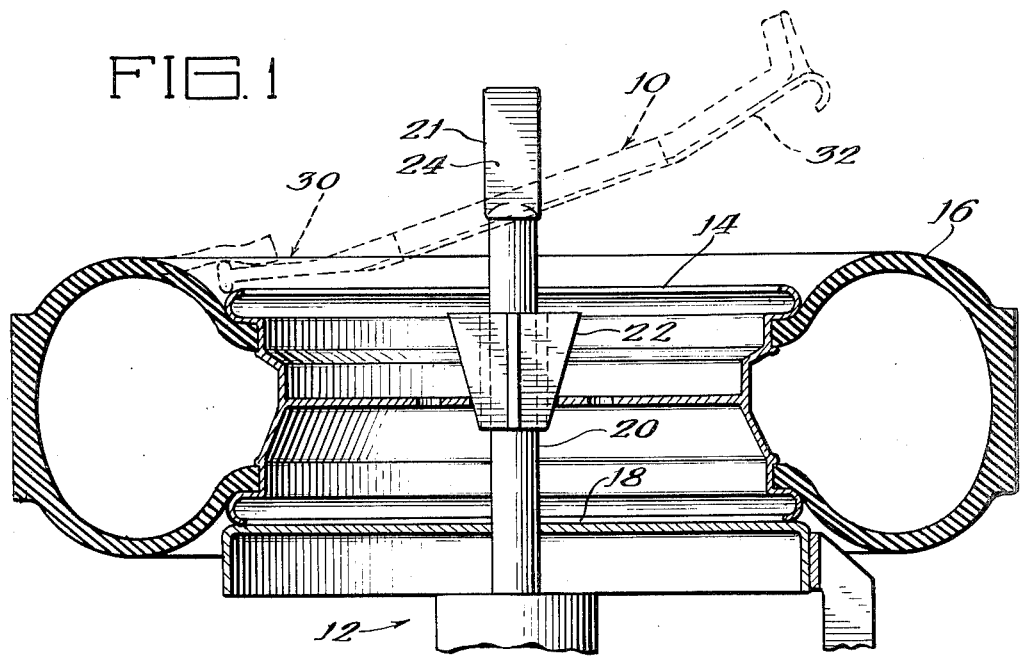
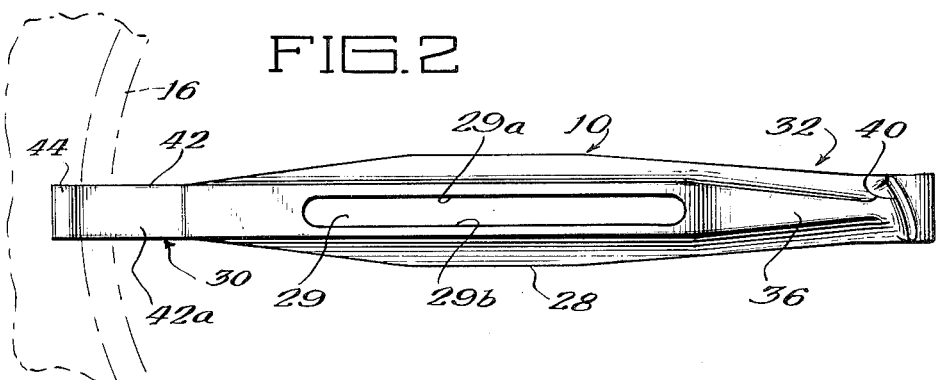
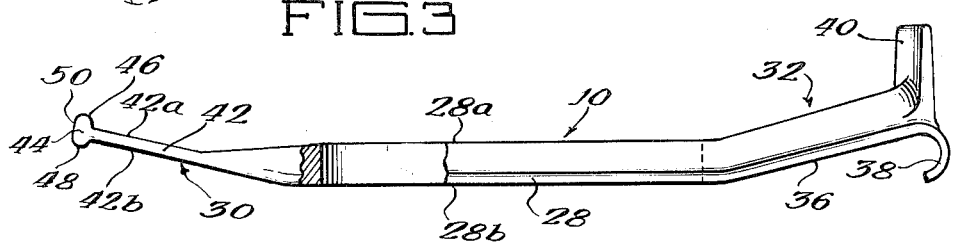
Inventors
Elmer J. Strang
Ray A. Scott
By: Hofgren, Wegner, Allen,
Stellman & McCord
Attorneys United States Patent Office 3,247,883
Patented Apr. 26, 1966

This invention relates to tire mounting and demounting devices and more particularly to a novel tire demounting tool.

Filling stations, tire stores and other service stations which perform a service of repairing and replacing tires for automotive vehicles are generally equipped with a tire changing stand. The wheel rim may be clamped onto the stand and various tools used in conjunction with the stand to remove or mount a tire relative to the rim.

Recently, certain tire changing stands have been constructed in a fashion to permit the removal of the tire casing from the wheel rim as well as the installation of the casing to the rim by a tool power driven by means incorporated in the tire changing stand. The present invention concerns an improved tool with which a tire casing may be removed from the wheel rim. The tool must be constructed to raise not only the upper bead of the tire casing above the upper edge of the wheel rim but also equipped to raise the tire lower bead over the upper wheel rim edge as well. The particular tools heretofore available for this purpose have generally been deficient in such operation, causing the operator considerable difficulty. The physical relationships of the parts of the tire tool are particularly chosen to help lift the upper bead over the wheel rim and also to lift the lower tire casing bead over the wheel rim as well.

It is the primary object of this invention to provide a new and improved tire removing tool substantially as described.

It is further the object of this invention to provide a new tire removing tool so constructed of parts related to each other such that the removal of tire casing beads from a wheel rim is facilitated.

It is another object of this invention to provide a new and improved tire demounting tool having an improved demounting end portion which may be utilized to lift a tire bead over a wheel rim without damaging an inner tube carried by the tire.

It is yet another object of this invention to provide a new and improved tire demounting tool which may be satisfactorily used with universal tire changing stands for demounting different sized tires from different sized rims.

It is a further object of this invention to provide a new and improved tire changing tool for use with a tire charger having a tire tool drive shaft wherein the tool has means on the tire engaging end for drawing the tire toward the center of the rim after the tire is lifted over the edge of the rim and the tool is emplaced on the tool drive shaft.

It is still a further object of this invention to provide a new and improved tire changing tool for use with a tire changer having a tire tool drive shaft wherein the tool is provided with means thereon for holding the tool in position against movement relative to the drive shaft when the tool is in engagement therewith holding a portion of the tire bead over the rim and the drive shaft is actuated to cause the tool to lift the rest of the tire bead over the rim.

Other objects, features and advantages of the present invention will be apparent from the following description of the preferred embodiment illustrated in the accompanying drawings, in which:

FIGURE 1 is a fragmentary section view of the vehicle rim with a pneumatic tire thereon being supported on the tire supporting platform of a tire changing stand with a phantom outline illustration of the tire changing tool of this invention lifting the tire bead over the wheel rim;

FIGURE 2 is a top plan view of the tire changing tool of this invention;

FIGURE 3 is a side elevational view partially broken away in section of the tire changing tool of this invention;

Figure 4:
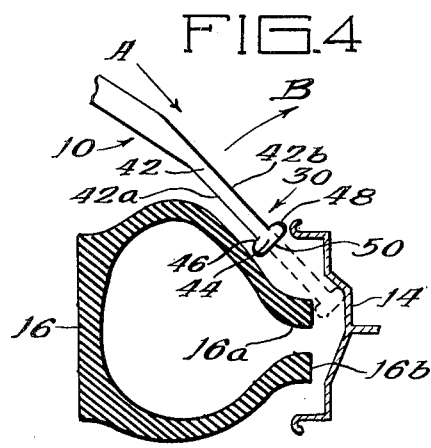
FIGURE 4 is a fragmentary section view showing a tire which has had its beads broken away from sealing engagement with the rim and showing the initial positioning of the tire tool of this invention for engaging the tire.

Referring now to the drawings, the tire tool 10 of this invention is intended for use with a tire changer 12 having a vehicle rim 14 mounting a pneumatic tire 16 positioned on the tire supporting platform 18 thereof. The tire changer 12 has an upright spindle 20 which carries a rotatably driven tire tool drive shaft 21. A clamping cone or hold down clamp 22 is telescoped over the spindle 20 for retaining the rim on the platform. The free end of the rotatable tire tool drive shaft 21 is provided with parallel flat sides, such as 24, for receiving the tire changing tool 10.

Referring more particularly to FIGURES 2 and 3, the tire changing tool 10 is an elongate body of heavy metal, such as steel, to accommodate the severe forces imposed thereon during tire demounting. The tool has a central portion 28 extending longitudinally of the body with a generally flat upper surface 28a and a generally flat lower surface 28b substantially parallel to the upper surface.

A centrally disposed longitudinally extending narrow slot 29 is provided in the body for receiving the tire tool drive shaft when the tool is telescoped thereover. The slot 29 has two parallel longitudinally extending sides 29a and 29b which closely embrace the flat sides 24 of the tool drive shaft.

The body 28 is provided with a tire disengaging end 30 and a tire installing end 32. The installing end 32 is inclined upward relative to the center of the body portion to facilitate tire manipulation while installing tires on a rim. A downwardly projecting inwardly directed hook 38 is formed at the free end of the installing portion 32 as well as an upwardly projecting arcuate prong 40.

The tire demounting end is provided with an inclined thin blade portion 42 having a generally flat upper surface 42a and a generally flat substantially parallel lower surface 42b. The flat lower and upper surfaces extend upwardly and away from the central portion at an obtuse angle relative thereto. A bulbous enlargement or knob 44 is formed at the free end of the blade portion 42. The knob 44 has a semicircular curved surface or bead engaging portion 46 which extends above the inclined portion 42 and a similarly semicircular curved surface or tube protecting and tool holding portion 48 which extends below the portion 42. The two curved portions 46 and 48 are joined by a flat terminal end portion 50.

Figure 5:
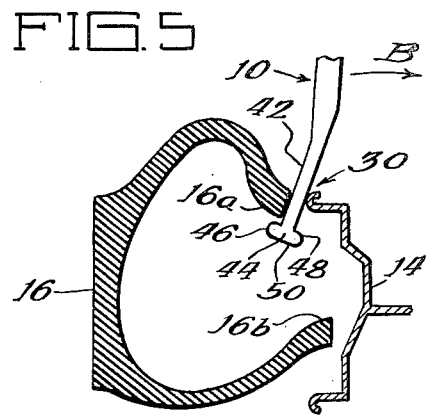
FIGURE 5 is a view similar to FIGURE 4 showing the tire tool lifting the upper tire bead over the rim.
Figure 6:
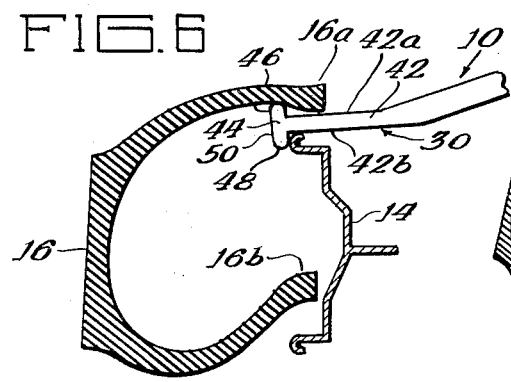
FIGURE 6 shows the upper tire bead and side wall lifted over the rim by the tire tool with the tire tool occupying a position similar to that shown in dotted outline in FIGURE 1.

Referring more particularly to FIGURES 4–6, after the tire beads 16a and 16b have been broken, or unseated relative to the rim, by well known bead breaker means, the demounting end 30 of the tool is inserted in the direction indicated by the arrow A in FIGURE 4 in an inverted position with the bead engaging portion 46 facing downward. When the tool has been inserted to a position indicated in dotted outline in FIGURE 4, it may be swung toward the center of the rim in the direction indicated by the arrow B in FIGURE 4 to lift the bead 16a over the rim 14.

In FIGURE 5 the tool is shown lifting the bead 16a over the rim, using the rim as a fulcrum. It is to be noted that the round bead engaging portion 46 serves to protect the bead 16a by eliminating any sharp surfaces which may cause damage thereto. Similarly, the curved portion 48 prevents pinching of an inner tube in the case of those tires utilizing inner tubes for the retention of air and therefore eliminates the possibility of puncture thereof. Continued movement of the tool toward the rim center lifts the bead 16a over the wheel rim and the tool becomes wedged between the tire and the rim, as shown in FIGURE 6. With the tool impaled on the tire tool drive shaft in a position similar to that illustrated fully in phantom outline in FIGURE 1, the shaft is driven to rotate the tire tool, and the bead 16a forms a chord across a circular portion of the rim. As the blade portion wedges most of the bead 16a over the rim in response to rotation of the tool, the flat upper surface 42a of the tool provides a smooth surface over which the tire bead may easily slide inwardly toward the center of the wheel rim to encourage smoother and more rapid bead lifting. Ultimately, enough of the bead is above the rim so that the tire bead may easily be lifted thereover to a position above the wheel rim.

Figure 7:
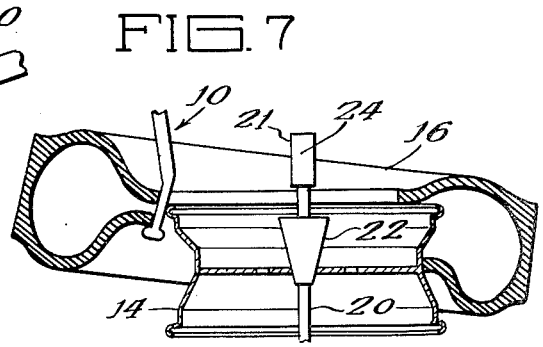
FIGURE 7 is a section view showing one bead and side wall of the tire lifted over the rim with the tire moved laterally relative to the rim in response to positioning the tire tool for prying the second or lower bead of the tire over the rim.
Figure 8:
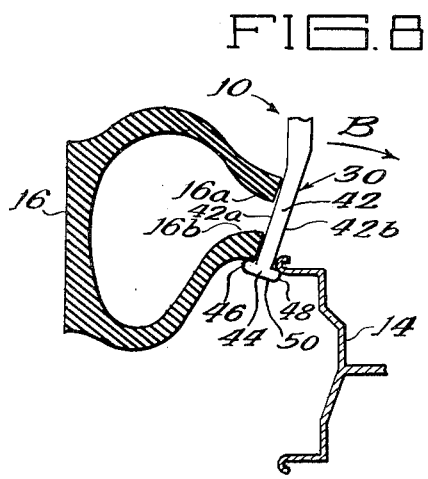
FIGURE 8 is a section view similar to FIGURE 5 showing the tire tool lifting the lower tire bead over the rim.
Figure 9:
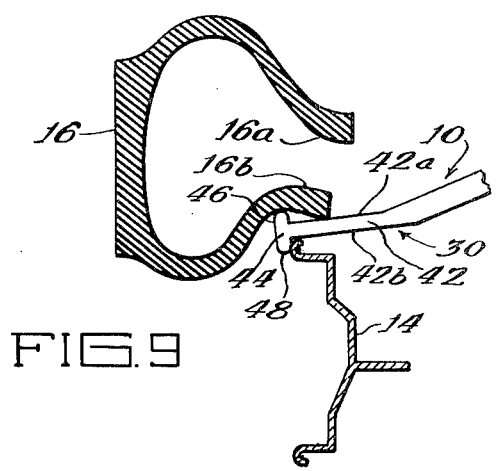
FIGURE 9 shows the lower tire bead and side wall lifted over the rim by the tire tool with the tire tool occupying a position similar to that shown in FIGURES 1 and 6.

After the upper head has been lifted over the rim the tool may be removed from the shaft and inserted between the rim and the upper and lower bead, as shown in FIGURE 7, so that the upper and lower beads on one side thereof are laterally displaced on the edge of the rim. It has been found that the unique configuration of the tool of this invention is particularly suited for insertion between the tire beads and the rim to lift the lower, as well as the upper, tire beads over the rim. In FIGURE 8, the tool is shown lifting the bead 16b over the rim, using the rim as a fulcrum, similar to the manner in which the bead 16a was lifted over the rim as illustrated in FIGURE 5. The tire tool is swung toward the center of the rim in the direction indicated by the arrow B in FIGURE 8 to be impaled on the drive shaft. This lifts the lower bead 16b over the rim, as shown in FIGURE 9, wherein the tool is wedged between the bead and the rim and the force of the tire holds the tool substantially in the position shown relative to the rim. As was the case with the upper bead, the lower bead forms a chord across a circular portion of the rim until enough of the bead is above the rim, as the tool is rotated by the driven shaft, so that the entire bead may be easily lifted above the wheel rim and the tire removed therefrom. The flat upper surface 42a of the bent portion 42 encourages the lower bead 16b to move inwardly toward the center of the rim as the upper bead is also encouraged to slide toward the rim center.

The slot 29 is elongated to permit the tool to be used with rims of different diameters. Therefore, if the tool were to be used with a rim of a smaller diameter than that shown in FIGURE 1, the tool would be displaced to the right relative to the position shown in phantom outline. Similarly, if the tool were to be used with a rim of a larger diameter than that shown in FIGURE 1, the tool would be displaced to the left. This relative movement is permitted by the extent of the slot 29. However, it is desirable to provide a means for holding the tool against longitudinal movement once the tire bead has been engaged by the tool and lifted over the tire rim so that upon rotation of the tool drive shaft the tool may effectively lift the remainder of the bead over the rim. The downwardly projecting curved tube protecting and tool holding portion 48 serves to provide such a means for holding the tool against relative movement. With the tool positioned as shown in FIGURES 6 and 9 with the tire beads 16a and 16b drawn over the rim and urging against the end 42 of the tool, the curved portion 48 is brought into abutment with the rim flange 14a as the tool is impaled on the shaft 21. This will prevent the tool from moving inward toward the spindle. In addition, the forces imposed on the tool by the tire, in combination with the upward incline of the main body portion 28, will tend to prevent the tool from sliding relative to the shaft so that it is effectively held in the position as shown in FIGURES 1 and 6 against relative movement so that the tire tool drive shaft may be rotated to drive the tool about the periphery of the rim and lift the tire beads thereover.

It has been found that certain specific dimensions of a tool incorporating the principles of this invention result in a tool which most effectively must be used for tire removing. The following dimensions are given by way of example and in no way are intended to limit the scope of the invention. In a tool having an overall length of approximately 18″ and an elongated slot of about 7½″ in length, the demounting end portion may be formed at an angle of approximately 15° to the main body portion of the tool beginning at a point on the underside of the tool approximately 3½″ from the free end thereof. The flat face 42a may extend for a length approximately 2½″. The thickness of the portion 42 should be approximately ¼″ with the curved portion 46 projecting thereabove approximately 3/16″ and the curved portion 48 projecting therebelow approximately 3/16″. It is to be understood that these dimensions are given by way of example only, the scope of this invention being to provide a tire tool for use with a tire changer having a tire tool drive shaft with means on the tool for drawing a tire bead toward the rim center as well as means for holding the tool relative to the shaft.

The tool of this invention has a relatively simple configuration making it easy to manufacture as well as relatively trouble-free in operation. The disengaging end portion of the tool is provided with parallel flat sides and is inclined at such an angle to the body portion thereof so that when the tool is impaled on the drive spindle and held at a point intermediate its ends on a plane above that of the wheel rim, the tool may be tilted so that the disengaging end is in a plane generally parallel to the wheel rim to aid in drawing the tire bead toward the center of the rim to further improve the bead lifting and tire removal function of the tool. The tool is also provided with means for protecting the tire bead comprising an upwardly projecting curved portion 46 and means for holding the tool against movement relative to the rim, this means being a downwardly projecting curved portion at the free end thereof which cooperates with the tire and the wheel rim to hold the tool against movement relative to the tool drive shaft though the shaft is inserted in an elongate slot in the tool. In addition, this downwardly projecting curved portion serves to prevent possible damage to tire inner tubes.

The foregoing detailed description has been given for clearness of understanding only, and no unnecessary limitations should be understood therefrom, for some modifications will be obvious to those skilled in the art.

What is claimed is:

1. A mounting and demounting tool for use with a powered tire stand for removing a tire bead over the peripheral edge of a tire rim, comprising: an elongated bar-like body having a central portion and a tire demounting extension on one end of the central portion, said demounting extension having a free rim engaging end and a blade extending upwardly and outwardly of the bar-like body, terminating in said free end and having an upper surface oriented generally parallel to the plane of the tire rim edge extending radially inwardly therefrom for a substantial distance when the tool is in an operative position with the central portion extending upwardly and away from the tire and the free end engaging the rim peripheral edge to permit the tire bead and side wall to freely move inwardly toward the center of the tire and rim as the tool is moved about the rim to lift the bead thereover.

2. The tire tool of claim 1 wherein said tool upper surface is generally smooth and flat.

3. A tire mounting and demounting tool for use with a tire stand for removing a tire bead over the peripheral edge of the tire rim, comprising: an elongated metal body having a central portion constructed and arranged for engagement with a spindle member of a tire changing stand; a tire demounting extension extending upwardly and outwardly from one end of the central portion, said demounting extension including a thin, generally flat metal blade terminating in a rim engaging end, said blade oriented generally parallel to the plane of the tire rim edge and extendinng radially inwardly therefrom for a substantial distance when the tool is in an operative position with rim engaging end abutting the rim peripheral edge and the central portion in engagement with a tire stand spindle and extending upwardly and away from the tire and rim to permit the tire bead and side wall to freely move inwardly over said flat metal blade toward the center of the rim as the tool is moved about the rim to lift the bead thereover.

References Cited by the Examiner

UNITED STATES PATENTS

| 2,569,789 | 10/1951 | Weaver | 157—1.22 XR |
| 2,712,350 | 7/1955 | Henderson | 157—1.22 |
| 3,104,695 | 9/1963 | McKinney | 157—1.22 |

FOREIGN PATENTS

| 566,529 | 9/1957 | Italy. |

GRANVILLE Y. CUSTER, JR., *Primary Examiner.*